No. 847,882. PATENTED MAR. 19, 1907.
E. R. BEACH.
SHAFT COLLAR.
APPLICATION FILED APR. 17, 1906.
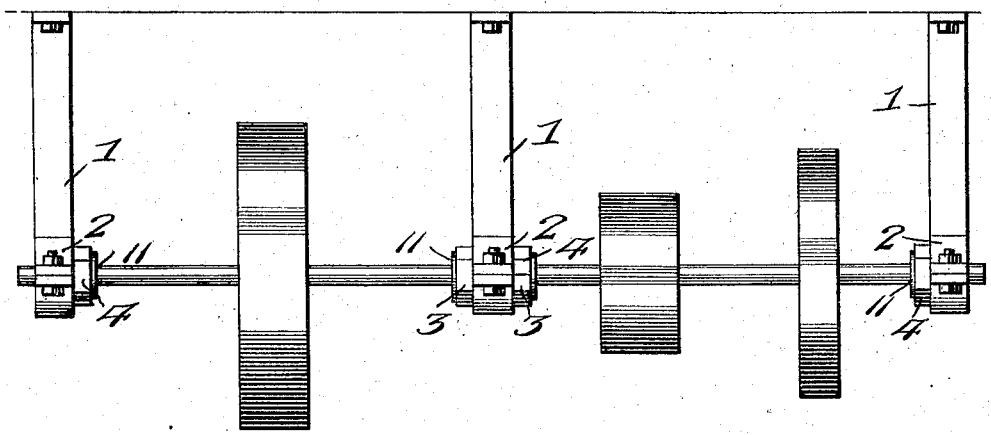
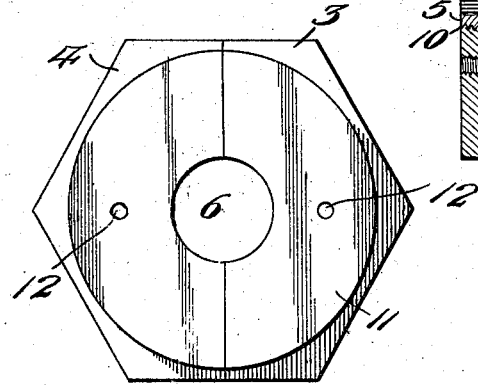
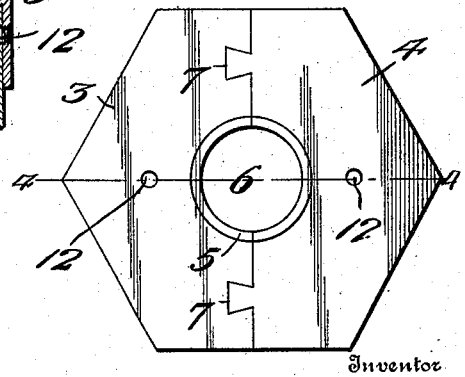
Inventor
Elmer R. Beach

UNITED STATES PATENT OFFICE.

ELMER R. BEACH, OF TRAVERSE CITY, MICHIGAN, ASSIGNOR OF ONE-THIRD TO GEORGE PERRINE AND ONE-THIRD TO JOHN NELSON, OF TRAVERSE CITY, MICHIGAN.

SHAFT-COLLAR.

No. 847,882.     Specification of Letters Patent.     Patented March 19, 1907.

Application filed April 17, 1906. Serial No. 312,220.

*To all whom it may concern:*

Be it known that I, ELMER R. BEACH, a citizen of the United States, residing at Traverse City, in the county of Grand Traverse and State of Michigan, have invented new and useful Improvements in Shaft-Collars, of which the following is a specification.

My invention relates to collars and in connection with shaft-hangers, and has for its object to provide a device of that character which when in applied position will prevent any lateral movement of the shaft from its journal-box.

Another object of the invention is to provide a collar that may be fitted to its position without it being necessary to remove the shaft from the hangers.

A further purpose of my shaft-collar is to so assemble the parts that the possibility of their loosening is reduced to a minimum.

I have clearly and fully illustrated the invention in the accompanying drawings, to be taken as a part of this specification, and wherein—

Figure 1 is a side elevation of a shaft and hanger, showing my collar in applied position. Fig. 2 is an end view showing the flange of the inner member. Fig. 3 is a view of the other end, showing the manner in which the blocks are connected. Fig. 4 is a cross-sectional view taken on the line 4 4 of Fig. 3.

In the drawings the reference-numeral 1 represents a shaft-hanger provided with a journal-box 2 of the usual structure.

3 represents the one half of the block member forming the collar, and the other or interlocking half is denoted by the numeral 4. Said members 3 and 4 are provided with semicircular recesses in their meeting faces intermediate their ends, as at 5, so that when the blocks are assembled the recesses will conform and provide a central opening 6, the opening 6 being of greater diameter at one end than at the other. On either side of the central opening 6 and at points midway between the opening and the edges of the block the meeting faces of the members 3 and 4 are provided with interlocking dovetails 7, said members 3 and 4 forming when so locked a block of hexagon design.

8 is a sleeve made in two sections and adapted to fit within the central opening of the hexagon block, for which purpose it is provided with screw-threads 9 on its outer periphery, said threads engaging with corresponding threads 10 in the wall of the opening of the hexagon block. One end of the sleeve is formed with a radial flange 11, adapted to bind against one of the ends of the hexagon block.

The body portion of the sleeve 8 is made with a greater thickness at the end adjacent the flange 11 than at its opposite end, said thickness narrowing toward and terminating with the end of the collar designed to bear against the journal-box. Thus from the foregoing description it will be seen that the inverse arrangement of the thickness of the sleeve and the block permit the same when assembled to be snugly fitted on the shaft. To further lock the sleeve to the block, and thereby prevent one member from unscrewing from the other by the constant turning of the shaft, I have provided screws 12, adapted to pass through the flange 11 of the sleeve 8 and the block, said block and flange having threaded recesses for that purpose, the length of the screws 12 being equal to the thickness of the flange and the block. When in fixed position and applied on the shaft, the halved portions 3 and 4 of the block are at right angles to the halved members of the sleeve 8. By this arrangement I secured an intact collar, since the dovetailed connection of the block members retain them in a vertically-locked position with regard to the sleeve, whose parts are fitted to each other on a horizontal plane.

From the foregoing description, taken in connection with the accompanying drawings, the construction of the invention will be understood without a further extended description.

I claim—

1. A shaft-collar comprising a collar proper provided with an opening, a sleeve having threaded engagement with the opening and adapted to receive the shaft, said sleeve being provided with a flange, and means passing through the flange and engaging the collar proper to prevent the sleeve from being separated from the collar proper by the rotation of the shaft.

2. A shaft-collar comprising a collar proper, said collar proper being provided with an opening and consisting of sections having interlocking engagement at points between the outer edge of the collar and said opening, a sleeve consisting of sections having threaded engagement with the opening in the collar proper, said sections being provided with flanges, and means passing through the flanges and engaging the collar proper to prevent the sleeve from being separated from the collar proper by the rotation of the shaft.

In testimony whereof I affix my signature in presence of two witnesses.

ELMER R. BEACH.

Witnesses:
JOHN NELSON,
JOS. DAMNING.